United States Patent
Beri et al.

(10) Patent No.: US 10,074,152 B2
(45) Date of Patent: Sep. 11, 2018

(54) GPU RENDERING OF KNOCKOUT GROUPS

(71) Applicant: Adobe Systems Incorporated, San Jose, CA (US)

(72) Inventors: Tarun Beri, Noida (IN); Harish Kumar, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 15 days.

(21) Appl. No.: 15/335,488

(22) Filed: Oct. 27, 2016

(65) Prior Publication Data

US 2018/0122036 A1  May 3, 2018

(51) Int. Cl.
*G09G 5/00* (2006.01)
*G06T 1/20* (2006.01)
*G06T 15/04* (2011.01)

(52) U.S. Cl.
CPC .............. *G06T 1/20* (2013.01); *G06T 15/04* (2013.01)

(58) Field of Classification Search
None
See application file for complete search history.

(56) References Cited

U.S. PATENT DOCUMENTS

| | | | |
|---|---|---|---|
| 7,151,546 B1 * | 12/2006 | Louveaux | G06T 5/20 345/619 |
| 2006/0066637 A1 * | 3/2006 | Hamburg | G06T 15/503 345/629 |
| 2013/0120381 A1 * | 5/2013 | Lau | G06T 15/04 345/423 |

\* cited by examiner

*Primary Examiner* — Yingchun He
(74) *Attorney, Agent, or Firm* — Finch & Maloney PLLC

(57) ABSTRACT

A knockout group includes a plurality of objects in a Portable Document Format (PDF) or similar document, which can be rendered by generating data representing a single-sampled shape texture, compositing each object with a backdrop, recording an accumulated shape of the object in the shape texture, and storing a final color of each pixel in a framebuffer for rendering on a display device. The objects in the knockout group are composited by blending, independently of a shape of any of the objects, a color of each pixel representing the respective object with a color of a pixel in the backdrop of the knockout group overlapped by the respective pixel. A final color of each pixel representing the respective object is computed as a function of the blended color, the color of the pixel in the backdrop prior to the blending, and the shape of the respective object.

17 Claims, 8 Drawing Sheets

GPU RENDERING OF KNOCKOUT GROUPS

FIELD OF THE DISCLOSURE

This disclosure relates generally to digital media processing, and more particularly, to techniques for rendering knockout groups using a graphics processing unit (GPU).

BACKGROUND

Knockout groups are used to create graphical effects, such as see-through text, in digital media. Graphical objects that are members of a knockout group are rendered such that the appearance of objects in the background that are overlapped by the objects in the knockout group is obscured (or knocked-out). In contrast to a transparency compositing model, where partially transparent objects permit visibility of background objects, objects in a knockout group do not permit visibility of objects in the background. By definition, a knockout object that completely covers a pixel obscures all objects in the background of the same pixel. However, if a knockout object partially covers a pixel, then the object only partially knocks-out background objects in the same pixel. This means, for example, that when properly rendered, a knockout object covering 30% of a pixel should only contribute to 30% of the pixel's color. The remaining 70% of the pixel's color should come from objects in the background. However, the actual amount of color from the object and the background depends on the rendering techniques employed.

For example, some existing techniques that are implemented in GPUs for rendering knockout groups rely on MSAA (multi-sampled anti-aliasing) for their functionality. With MSAA, each pixel on the screen is broken down into multiple sub-pixels (typically eight sub-pixels). The knockout resolution is therefore limited to the number of such sub-pixels. In other words, if a sub-pixel is partially covered by a knock-out object, then the sub-pixel is treated as fully covered and all objects underneath the sub-pixel are knocked-out. The sub-pixels that are not covered by a knockout object continue showing colors from objects underneath. Increasing the number of sub-pixels under MSAA improves the resolution, but at the expense of increased memory usage and processing time.

Some existing multi-sampling techniques also use a depth buffer to maintain Z-ordering among objects in knockout groups. Maintaining Z-ordering supports a knockout requirement that every object inside a knockout group composites with the group's initial backdrop rather than the objects underneath. By maintaining Z-order, such knockout techniques on a GPU keep track of pixel coverage of objects and knockout groups and allow objects and sub-groups within a knockout group to composite correctly. However, using multi-sampling and a depth buffer has performance and memory implications making these techniques inefficient when rendering complicated artwork. The ill-effects of performance and memory are more pronounced while rendering content in CMYK color space which inherently requires more memory than RGB. Therefore, there is a need for improved techniques for GPU rendering of knockout groups.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
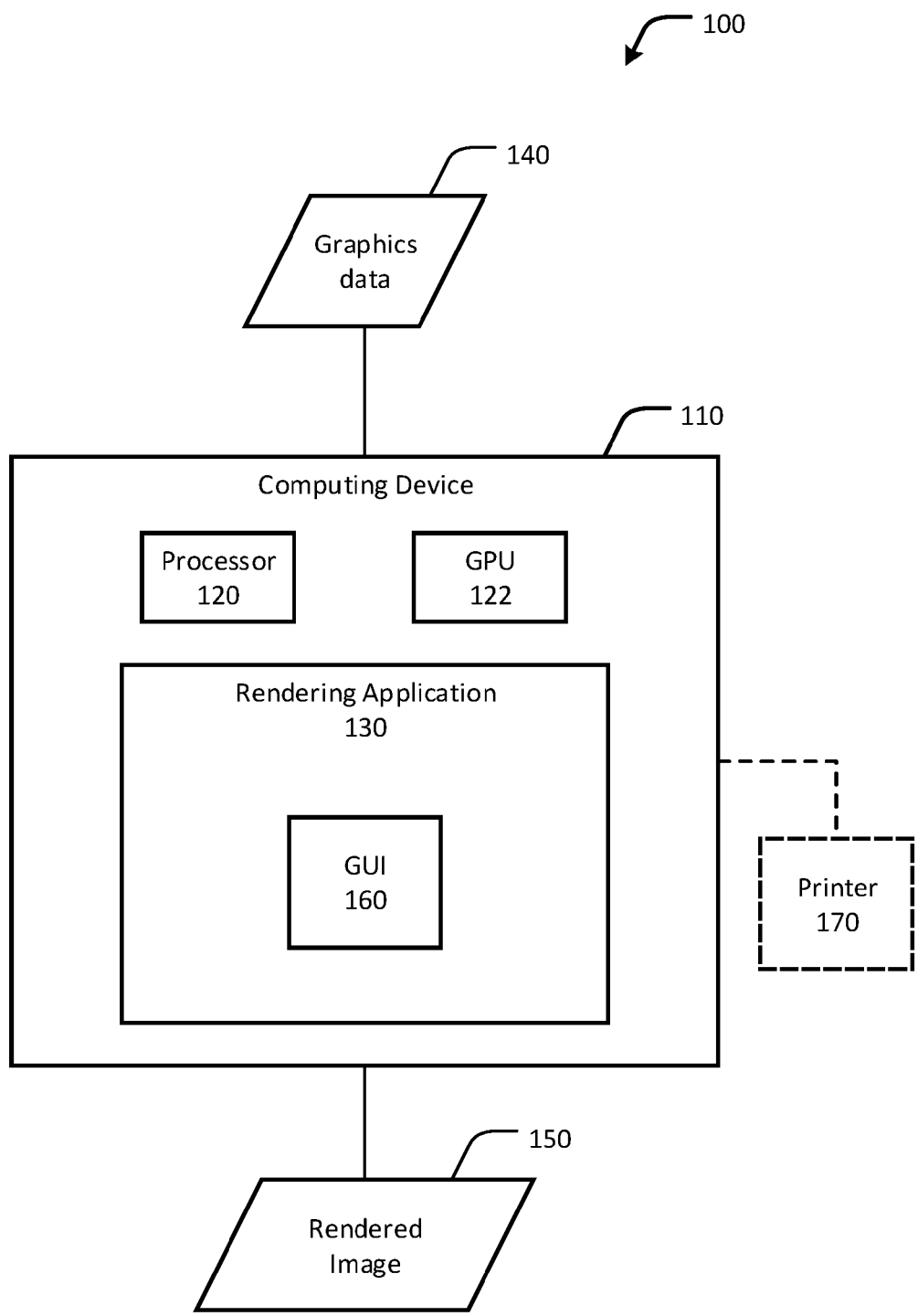
FIG. 1 shows an example system for rendering knockout groups using a GPU, in accordance with an embodiment of the present disclosure.

In accordance with embodiments of the present disclosure, techniques are disclosed for rendering knockout groups using a graphic processing unit of a computing device without using multi-sampled anti-aliasing or depth buffers. Instead, a non-multi-sampled (single-sampled) shape texture that represents the shape (coverage) of all knockout objects at all pixels is used for composition operations during object rendering. Generally, each knockout object is first composited with a backdrop of the group without regard to the shape of the object to produce an intermediate color for the corresponding pixels. Next, a final color of each pixel is linearly interpolated as a function of the intermediate color, the backdrop color, and the shape of the object at the corresponding pixel, such that the percentage of object color and backdrop color at each pixel accurately reflects the shape of the knockout object.

To this end, and in accordance with an embodiment of the present disclosure, a knockout group includes a plurality of objects encoded in a Portable Document Format (PDF) compatible document or encoded in a document conforming to any specification derived from, or similar to, PDF, including SVG (Scalable Vector Graphics), AI (Adobe Illustrator®) and INDD (Adobe InDesign®). More generally, any document that supports knockout groups and knockout behavior can be used, including documents supporting a page description language similar to PDF, a vector graphics markup language similar to SVG, or see-through (transparent or semi-transparent) text. A technique for rendering one or more knockout groups using a GPU includes generating data representing a single-sampled shape texture of the knockout group, compositing each object of a knockout group with a backdrop of the knockout group, recording an accumulated shape of the object in the shape texture, and storing a final color of each pixel in a framebuffer for rendering on a display device. The objects in the knockout group are composited by blending, independently of a shape of any of the objects, a color of each pixel representing the respective object with a color of a pixel in the backdrop of the knockout group overlapped by the respective pixel. The blended color is an intermediate color of the respective pixel. A final color of each pixel representing the respective object is computed as a function of the intermediate color, the color of the pixel in the backdrop prior to the blending, and the shape of the respective object, thereby knocking out at least a portion of the pixel in the backdrop based on the shape of the respective object. In some cases, the shape of the respective object is represented by a fractional coverage value, and the final color of the respective pixel is computed by adding a product of the fractional coverage value and the intermediate color of the respective pixel to a product of a complement of the fractional coverage value and the color of the pixel in the backdrop. The process can be repeated for each knockout group in the document. Numerous configurations and variations will be apparent in light of this disclosure.

The Portable Document Format (PDF) international standard ISO 32000 defines a digital form for representing electronic documents to enable users to exchange and view such documents independent of the environment in which they were created or the environment in which they are viewed and printed. A PDF document is a data structure composed of so-called data objects. As used in this disclosure, the term "object" includes a sequence of operators and operands that describe the content and appearance of a document, such as text and graphics, encoded in a PDF format or a format similar to PDF that supports knockout behavior, such as SVG, AI, and INDD. PDF also includes objects (e.g., annotations and hypertext links) that are not part of the page content itself but are useful for interactive viewing and document interchange.

As used in this disclosure, the term "knockout group" refers to a group of objects (text, images, paths, etc.) encoded in a PDF document (or encoded in a document that conforms to a specification derived from, or similar to, PDF or a document that supports knockout behavior) in which each object is composited with an initial backdrop rather than with objects in another preceding or underlying group of objects. An object's shape (at a pixel) is a fractional value from 0.0 to 1.0, inclusive. An object composited with the initial backdrop completely knocks out (completely obscures) the effect of earlier-rendered (i.e., underlying) objects within the same group at all places where the shape of the object is 1.0. In other words, for any given pixel, only the topmost object contributes to the final color and opacity of the pixel. An object composited with the initial backdrop partially knocks out (partially obscures) the effect of underlying elements within the same group at places where shape is less than 1.0. In other words, for any given pixel, the final color and opacity is a combination of the color and opacity of the topmost object and the underlying object. A shape value of 0.0 leaves the opacity and color values of the underlying object unchanged. Knockout groups are useful when composing graphics where the topmost object completely or partially obscures underlying objects while interacting with the group's backdrop in a usual manner. A knockout group can be nested inside another knockout group or inside a non-knockout group. Similarly, a knockout group can nest other knockout and non-knockout groups. In such cases, shape values of objects carry their knockout behavior outside their immediate parent group (to knockout groups placed higher in the hierarchy). Thus, partial shape data is maintained at the group level.

FIG. 1 shows an example system 100 for rendering knockout groups using a GPU, in accordance with an embodiment of the present disclosure. The system 100 includes a computing device 110 having one or more processors 120 and a graphics processing unit (GPU) 122. The computing device 110 is configured to execute a rendering application 130 which is executable, controllable, or both, by one or more of the processors 120 and the GPU 122. The rendering application 130 is configured to receive graphics data 140 (e.g., a PDF document) or other media content containing a knockout group, and to generate a rendered image 150 based on the graphics data 140 (e.g., a rendered PDF document). The rendered image 150 can be displayed via a GUI 160 of the rendering application 130 or, in some embodiments, printed via a printing device 170.

More particularly, in an embodiment, the graphics data 140 include data encoded in a PDF (or similar) format for generating a PDF (or similar) document. The graphics data 140 can include one or more objects forming one or more knockout groups, which are arranged in a hierarchal manner with other knockout groups or non-knockout groups (per the PDF standard, a knockout property is defined on a group of objects and not on individual objects). The rendering application 130 is configured to render the graphics data 140 into the rendered image 150 (e.g., the PDF document) according to the standard set forth in ISO 32000 (or a similar standard) and using the techniques described in this disclosure. Further details of this process are described below with respect to FIGS. 3-6. Although FIG. 1 depicts a single computing device 110, it will be understood that, in some embodiments, portions of the processing performed by the rendering application 130 is distributed among multiple computing devices (e.g., a back-end server may be configured to perform some or all of the functions of the rendering application 130).

Figure 2A:
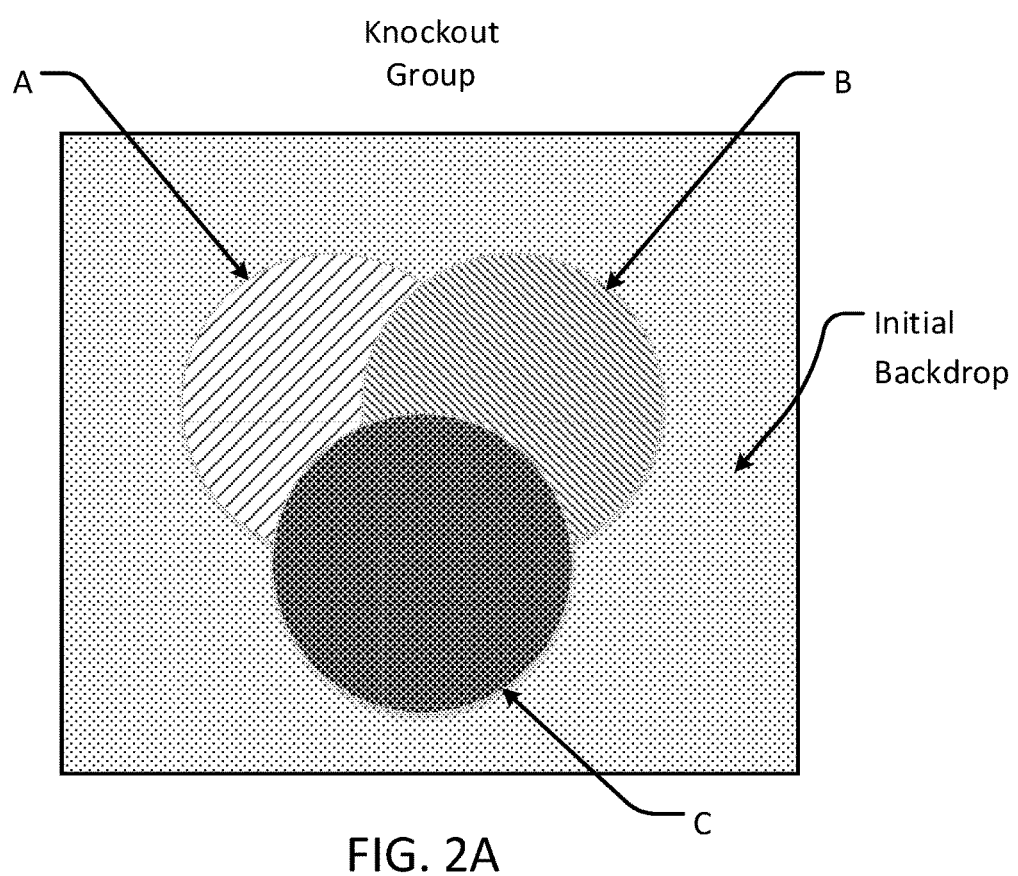
FIG. 2A shows an example of a rendered document, in accordance with an embodiment of the present disclosure.

FIG. 2A shows an example of a rendered document having several overlapping objects A, B and C. One or more of the objects A, B, C can form at least part of a knockout imaging model, in which the objects A, B, C can be fully opaque. The objects A, B, C in the model are said to "knockout" or obscure underlying objects and backdrops in the order that they are rendered. Each object A, B, C is painted on the page in a particular sequence (e.g., A then B then C). The existing contents of the page at the time any of the objects A, B and C are rendered form a so-called backdrop with which the newly rendered object is composited, producing results that combine the colors of the object and backdrop. For example, in FIG. 2A, all of the objects A, B and C are rendered such that the objects A, B and C completely obscure the underlying objects and backdrop by replacing the underlying colors with the colors of the respective object A, B, C.

As noted above, one or more of the objects A, B, C on the document page form a knockout group, where a stacking order is the order in which the objects are specified and rendered, bottommost object first. All of the objects A, B, C in the stack can potentially contribute to the result, depending on their colors and shapes. For example, objects A, B and C may form one knockout group, where C overlays B and B overlays A, which in turn overlays the initial backdrop. Alternatively, one or more of the objects A, B, C can each form different knockout groups. For example, objects A and B may form one knockout group (a parent knockout group) and object C may form another knockout group (a child knockout group). Other combinations are possible, as will be apparent in view of this disclosure.

Figure 2B:
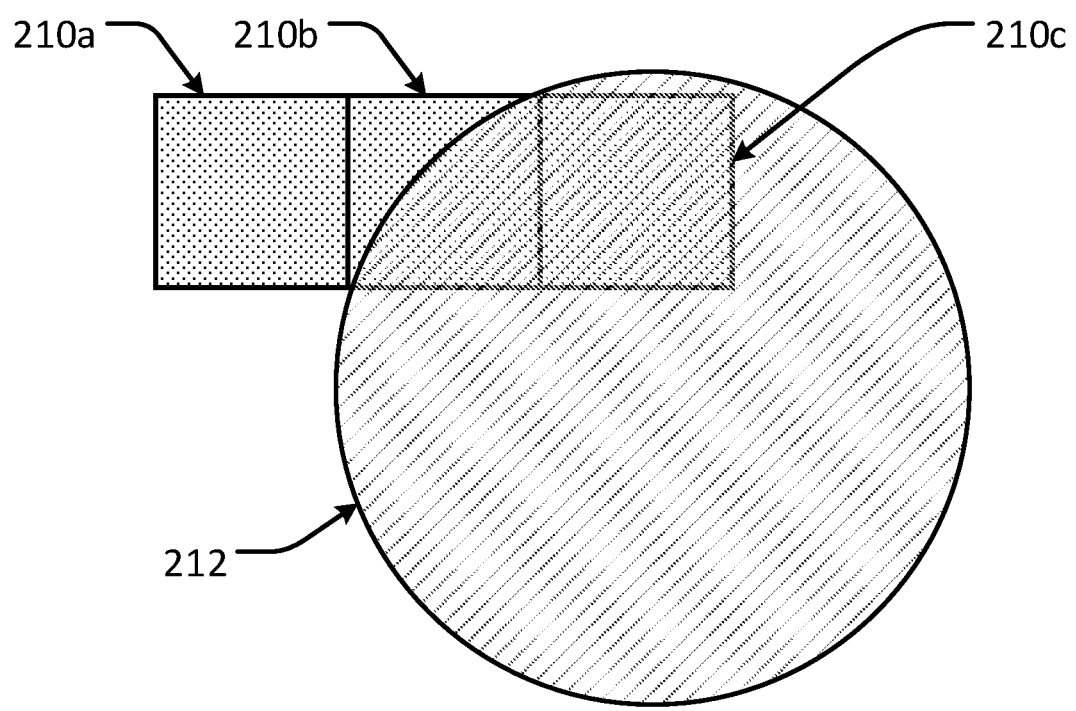
FIG. 2B shows a portion of an example rendered document, in accordance with an embodiment of the present disclosure.

A document can be rendered by painting the objects A, B and C onto a display device or GUI having a plurality of pixels, where each pixel represents a color of the object. A knockout object may completely or partially cover a given pixel in the display. FIG. 2B shows a portion of an example rendered document in which a knockout object 212 does not cover pixel 210a, partially covers pixel 210b, and fully covers pixel 210*c*. In FIG. 2B, the covered portions of pixels 210*b* and 210*c* are shown for descriptive purposes but are not necessarily visible (i.e., the covered portions of pixels 210*b* and 210*c* are completely obscured by the knockout object 212 when rendered). The shape of the object 212 influences the visibility of underlying objects where the object 212 completely or partially overlaps the underlying objects, as in pixels 210*b* and 210*c*. Therefore, the color of each pixel 210*a*, 210*b* and 210*c* must account for the coverage of the object 212. For example, pixel 210*a* shows the backdrop color, pixel 210*b* shows a combination of the backdrop color and the color of the object 212, and pixel 210*c* shows only the color of the object 212.

To account for the coverage of an object at a given pixel, some existing graphics rendering techniques rely on multi-sampled anti-aliasing (MSAA) to handle fractional shape values of objects (at one or more pixels). Multi-sampling logically divides a pixel into sub-pixels, and shape values are indirectly computed from the number of sub-pixels covered by an object. For example, with a multi-sampling factor of eight, an object covering four sub-pixels is said to have a shape value of $4/8$ (or approximately 0.5) and an object covering two sub-pixels is said to have a shape value of $2/8$ (or approximately 0.25). The coverage resolution, however, is limited to the number of sub-pixels. In other words, with MSAA, partial coverage of sub-pixels is not considered. The following sequence of steps is executed for rendering every object with MSAA.

a) Find the object's bounding box and tessellate the bounding box into two triangles.

b) For every transparency group, initialize depth buffer (z) to a value n. Note that the number n increases for every group.

c) Use the bounding box's triangles to copy the current color data into another texture (T).

d) Use the bounding box's triangles and replace with the knockout group's initial backdrop.

e) Composite the object's triangles and set depth buffer values to z=n+t.

f) Use the bounding box's triangles to copy back the object's backdrop from texture T wherever z=n.

g) Reset pixels drawn with z=n+t to z=n.

Using this approach, every time an object is drawn, its backdrop is temporarily copied out and replaced with group's initial backdrop. Then the object is drawn in multi-sampled mode at a little higher depth than the existing depth. All sub-pixels that are not changed after the object has been drawn are restored with the data from the texture initially copied out. To achieve this, appropriate hardware depth tests are used. In case of a knockout group nested (one or more levels deep) within another knockout group, the group's depth n represents the shape of the group after all its constituent objects are composited. This information is used while compositing the group with its parent. It will be understood that variants of the above described scheme are also possible. For example, the objects may be rendered using progressively decreasing depths rather than increasing depth. The depth tests can be adjusted accordingly.

The dependency of the existing solution on multi-sampling increases the storage requirement for the entire screen (and any associated textures/buffers like stencil and depth buffers) by "N" times ("N" being the multi-sampling factor). The typical value of "N" is 8. However, on some GPU hardware, a multi-sampling factor of 16 is also possible (which further doubles the memory requirements). Not only do memory requirements grow, but also the number of pixels the GPU pipeline has to process. The pixels to be processed also grow "N" times (e.g., when per sample shading is used), which drastically reduces rendering performance. While there are techniques that process fewer than "N" pixels (a lesser number of sub-pixels per pixel), such techniques compromise accuracy. This overuse of memory can prevent simultaneous processing of several complicated artworks, especially when the underlying color space is CMYK, which inherently needs more memory than RGB. As stated earlier, the involvement of depth buffer, depth tests and texture copies further reduce processing speed.

In contrast to MSAA, a technique in accordance with an embodiment of the present disclosure provides an efficient technique to render knockout groups on GPUs. The disclosed technique decouples the object composition into two steps: the first step assumes that the object being composited has full coverage (i.e., shape 1.0) at all pixels and composites with the group's backdrop. The subsequent step uses the actual shape value to linearly interpolate the resultant color value (from first step) with the existing color underneath. Since the linear interpolation factor is governed by the actual coverage/shape of the object at every pixel, this replaces (or knocks out) only the desired amount of color underneath, thus achieving the correct knockout behavior.

For knockout composition across groups, in accordance with an embodiment, the shape data from constituent objects in a knockout group is recorded in a single-sampled shape texture called ShapeTexture. The shape data from overlapping pixels is aggregated by performing a union of shape values. The contents of the shape texture are propagated higher up the parent hierarchy to other knockout group(s), if any, and at each level the knockout group is composited with its parent using shape data from this shape texture.

The above steps, according to an embodiment, support knockout groups on GPUs without the involvement of multi-sampling, depth buffer and texture copies. This reduces usage of GPU memory and renders complicated artworks more efficiently and correctly than MSAA (which does not account for partial coverage of sub-pixels). Further, in some embodiments, special hardware operations like dual source blending are used to speed-up some operations, as will be described in further detail below.

Figure 3:
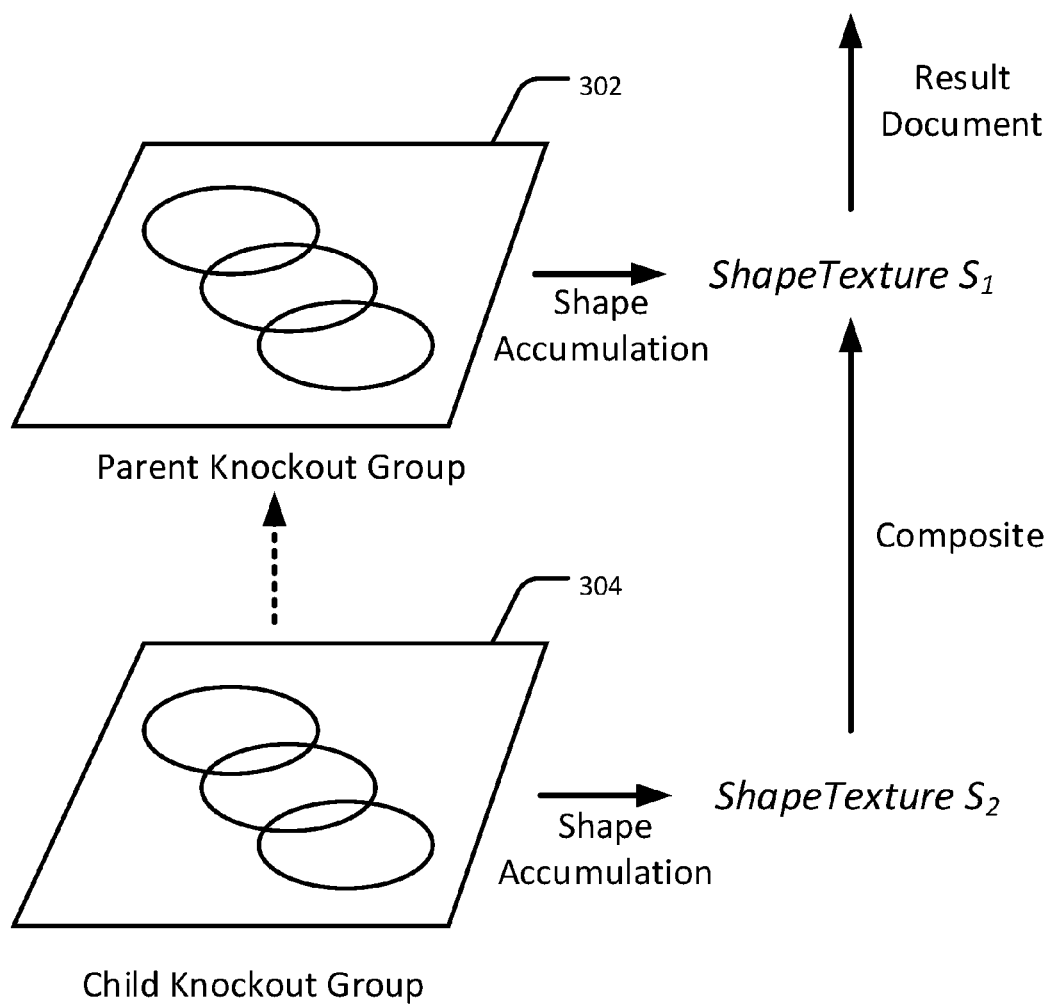
FIG. 3 is an overview of an example process for rendering knockout groups, in accordance with an embodiment of the present disclosure.

FIG. 3 is an overview of an example process for rendering knockout groups, in accordance with an embodiment of the present disclosure. Data representing a shape texture Shape-Texture (e.g., $S_1$ and $S_2$) is created for each knockout group (e.g., a parent knockout group 302 and a child knockout group 304) to achieve the knockout effect. A shape texture can be created for every knockout group or for a non-knockout transparency group whose parent hierarchy includes a knockout group. As the objects in each group 302, 304 are rendered, the shape (pixel coverage) of the objects are accumulated with, and recorded into, the shape texture $S_1$, $S_2$ corresponding to the group 302, 304. When all objects in the group 302, 304 are rendered, ShapeTexture contains shape data for the group (e.g., $S_1$ for group 302 and $S_2$ for group 304). The ShapeTexture is then used to composite the child group 302 with its parent 304 (if the parent is a knockout group) to produce a result document (e.g., $S_2$ is composited with $S_1$). The child group is also an object of its parent group, and the child group is composited into the parent group. Thus, $S_1$ is complete only after $S_2$ is accumulated into it.

Figure 4:
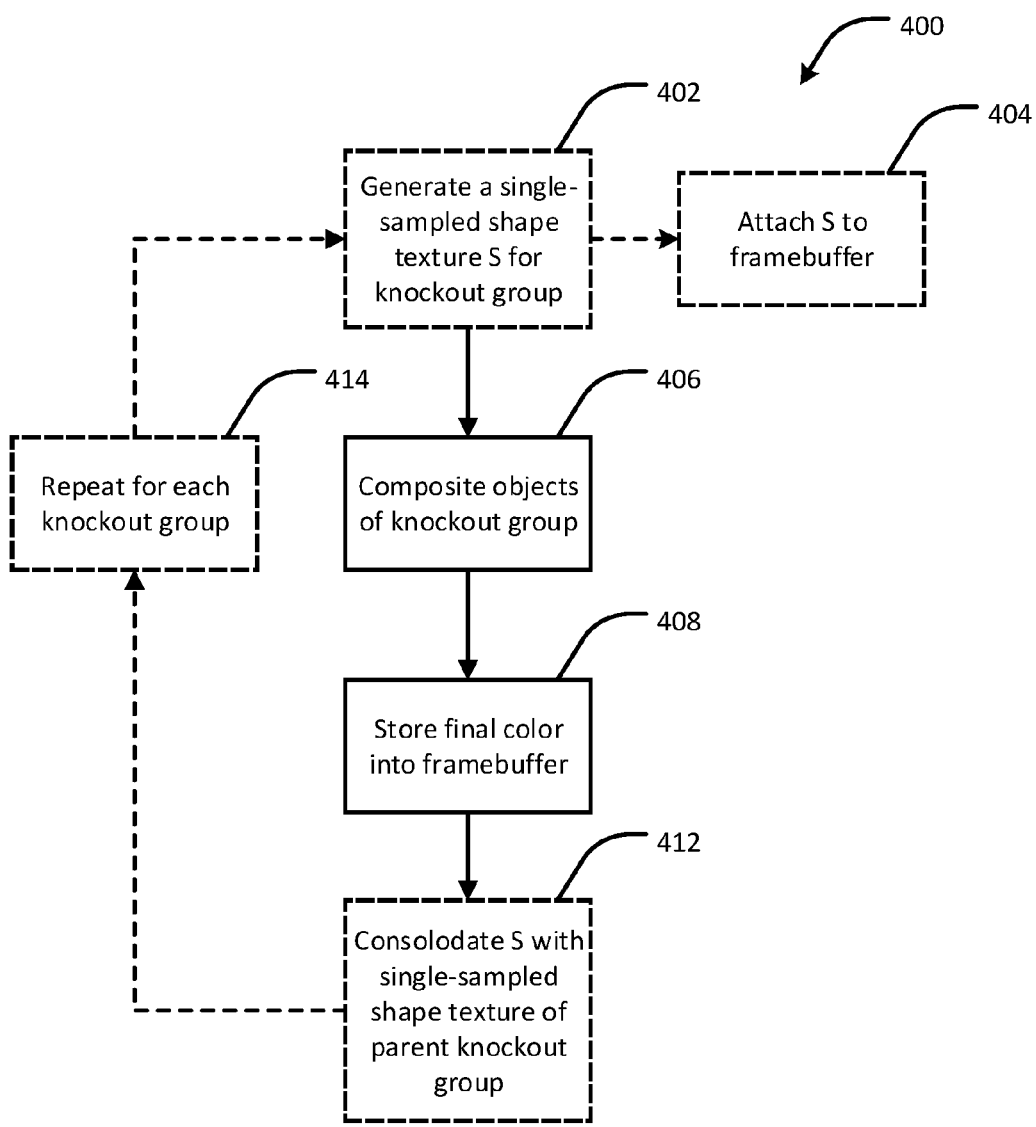
FIG. 4 is a flow diagram of an example methodology for rendering a knockout group, in accordance with an embodiment of the present disclosure.

FIG. 4 is a flow diagram of an example methodology 400 for rendering a knockout group, in accordance with an embodiment of the present disclosure. The methodology 400 may be performed, for example, by the computing device 110 of FIG. 1. The methodology 400 includes generating

402 a single-sampled shape texture ShapeTexture (S) for a knockout group including one or more objects in a PDF (or similar) document, and attaching 404 the shape texture to a framebuffer. The shape texture is generated 402 for each knockout group whose parent hierarchy includes at least one knockout group (i.e., a knockout group with a knockout parent, knockout grandparent, etc.). However, in some cases, if the hierarchy does not have any knockout groups, then the shape texture is not needed, since a purpose of the shape texture is to record the shape of the knockout group, which is only used when a group is composited with a knockout group. In such cases, the generating 402 and attaching 404 acts can be omitted from the methodology 400. In some cases, the shape texture is attached to the framebuffer as the last attachment of the framebuffer. In an embodiment, the shape texture is formatted as GL_R16, which means that each shape value is represented in 16 bits. However, other data formats can be used.

The methodology 400 further includes compositing 406 each object in the knockout group. The objects are composited one by one using a painter's algorithm. The painter's algorithm renders objects in a depth order such that if one object obscures part of another then the first object is painted after the object that it obscures. In some embodiments, other compositing algorithms may be used.

Figure 5:
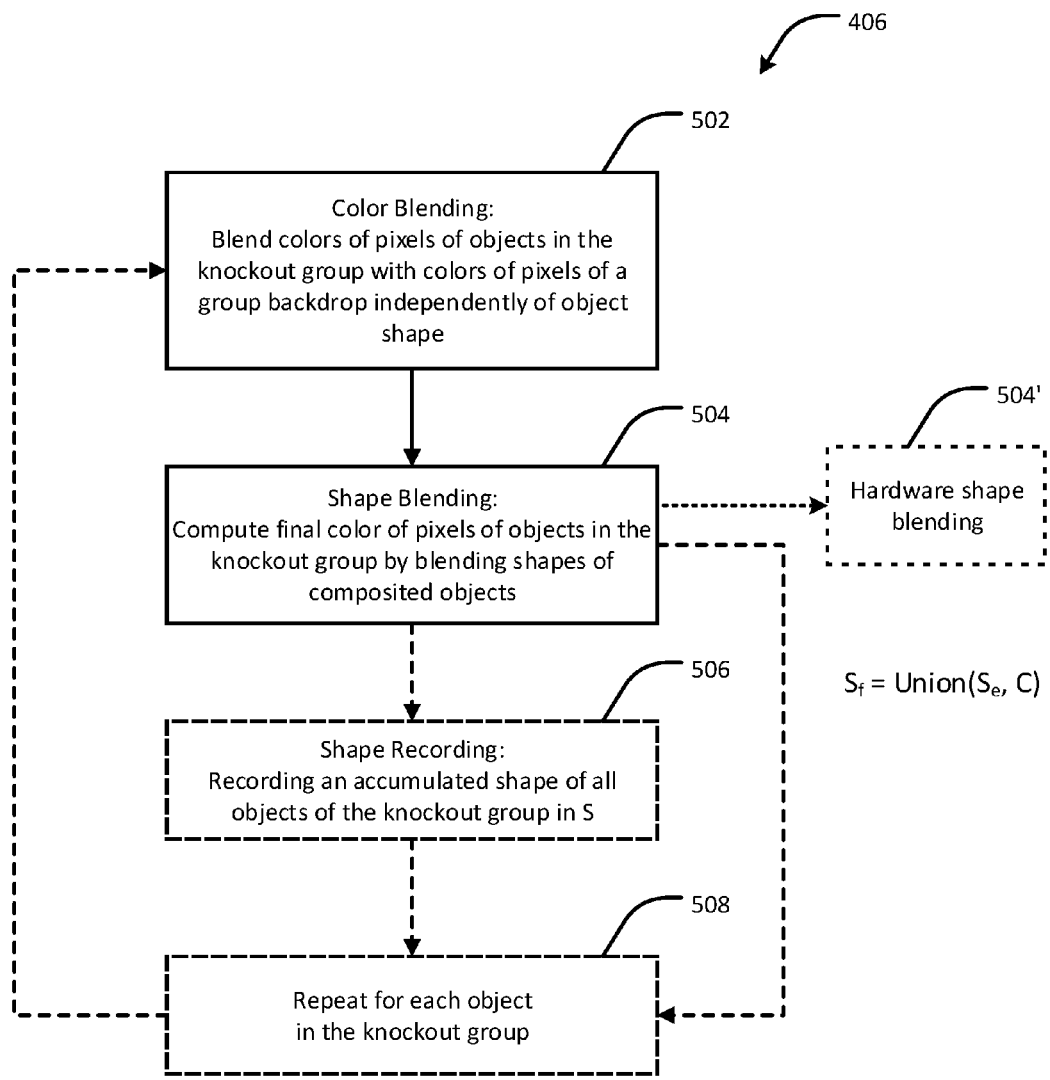
FIG. 5 is a flow diagram of an example methodology for compositing objects in a knockout group, in accordance with an embodiment.

FIG. 5 is a flow diagram of an example methodology for compositing 406 objects in the knockout group, in accordance with an embodiment. During compositing, color and shape data are blended as follows.

Color Blending: First, as each object is rendered, a color of each pixel representing the respective object in the knockout group is blended 502 with a color of a pixel in the backdrop of the knockout group overlapped by the respective pixel, thereby producing an intermediate color of the respective pixel. The colors are blended independently of a shape of any of the objects of the knockout group. In other words, the shape of the object being rendered at all pixels is considered to completely cover the pixel in the backdrop (e.g., shape coverage of 1.0) regardless of the actual shape value, which, as noted above, ranges from 0.0 to 1.0. For knockout groups, the blending backdrop is the initial backdrop for the group. For non-knockout groups, the blending backdrop is the immediate backdrop for the group. In this manner, pixels that are at least partially covered by an object obtain the color of the object at that pixel, while pixels that are not covered at all by any object retain the color of the pixel in the backdrop. The backdrop may, for example, be fed to a GLSL (OpenGL Shading Language) shader as an input texture.

Shape Blending: Next, a final color of each pixel representing the respective object is computed 504 as a function of the intermediate color, the color of the pixel in the backdrop prior to the blending, and the shape of the respective object, thereby knocking out at least a portion of the pixel in the backdrop based on the shape of the respective object with a backdrop for the group. In this manner, the actual shape of the object is factored into the backdrop. For a particular pixel, the object's shape (or coverage) is given by C. The following formula is used to compute the final color value of the pixel:

$$P = C^* + P_1 (1-C)^* B$$

where P is the final color of the pixel, C is the fractional pixel coverage (e.g., 0.0 to 1.0) of the object being rendered, $P_1$ is the color obtained after the color blending step described above, and B is the color of the pixel in the framebuffer (i.e., the immediate backdrop or the color of the object underneath). Computation of C can be accomplished in any number of different ways, such as described by C. Loop et al. in *Resolution Independent Curve Rendering using Programmable Graphics Hardware*, available at http://research-.microsoft.com/en-us/um/people/cloop/LoopBlinn05.pdf. Alternatively, the C value can be externally supplied by a user (e.g., in an image with AIS (Alpha Is Shape) property set, mandating that their alpha value be used as the shape).

In an embodiment where the object is a member of a non-knockout transparency group, rather than a member of a knockout group, the object's shape (or coverage) can be given by the accumulated shape texture S of the parent group, as described in further detail below. This is because the shape of the non-knockout group is not needed to stand alone during this process.

Figure 6:
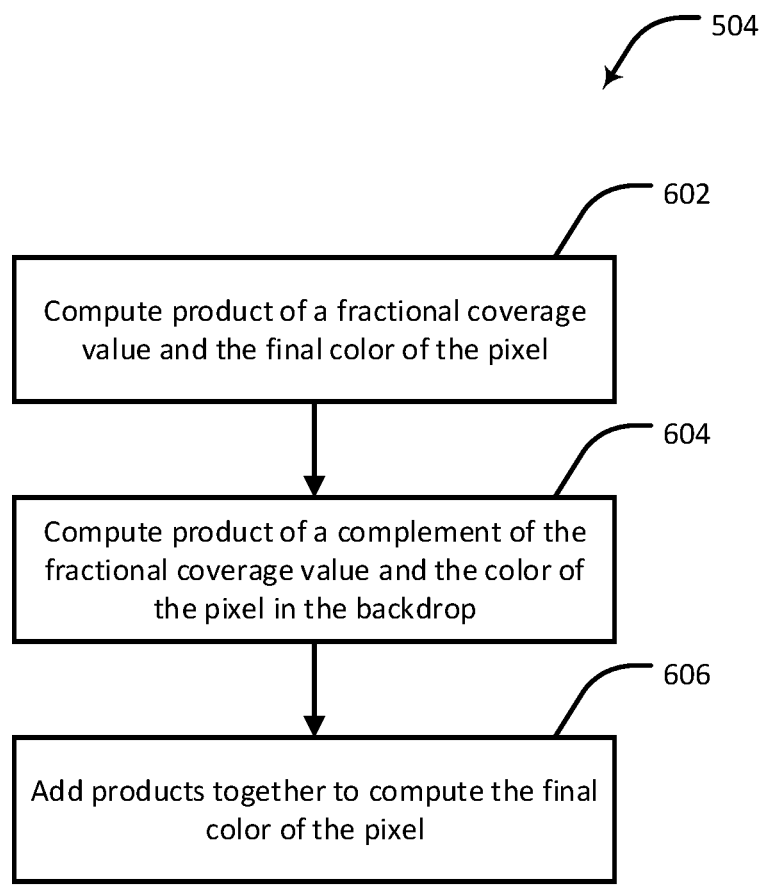
FIG. 6 is a flow diagram of an example methodology for computing a final color of a pixel, in accordance with an embodiment of the present disclosure.

FIG. 6 is a flow diagram of an example methodology for computing 504 the final color of a pixel, in accordance with an embodiment of the present disclosure. As described above, the final color can be computed by computing 602 a product of a fractional coverage value (C) of the object being rendered and the intermediate color of the pixel after the color blending 502 ($P_1$), computing 604 a product of a complement of the fractional coverage value (1-C) and the color of the pixel in the backdrop (B), and adding 606 the products together, such as in the equation above. The final color of a pixel is the weighted interpolation of the existing color and the color of the object's pixel being drawn. The new object replaces (knocks-out) the fraction equal to the coverage of the object. If the object being drawn has a coverage value of 1.0, the formula above can be reduced to $P=P_1$; that is, the final color of the pixel is the color of the object being drawn. The shape blending step is used when compositing children within a knockout group.

Shape Recording: Referring again to FIG. 5, any object higher up the group hierarchy may form at least part of a knockout group. In this case, the shape of the object being rendered is consolidated into the shape of the parent group. The parent group uses the consolidated shape when it is composited with its parent group, and so forth. The shape C of an object is accumulated 506 while it is rendering in the ShapeTexture. Multiple objects in a group can overlap each other. Thus, the final shape of a group at any pixel is the result of contribution of all objects that partially or fully occupy that pixel, as follows:

$$S_f = \text{Union}(S_e, C)$$

where $S_f$ is the final shape at the pixel after the current object has been composited, $S_e$ is the existing shape at the pixel before the current object has been composited, and C is the shape of the current object at the pixel. In some cases, the union can be computed using GPU hardware blending.

The compositing process is repeated 508 for each object in the knockout group. Once all of the objects inside the group are composited, the group's shape is stored in the shape texture S and can be used to composite the knockout group with its parent, if the parent is a knockout group.

Referring again to FIG. 4, the methodology 400 further includes storing 408 the final color of each pixel into the framebuffer for rendering on a display device. In cases where there is more than one knockout group, the shape texture S is consolidated 412 with the single-sampled shape texture of a parent knockout group, and the methodology 400 is repeated 414 for each knockout group.

The rendering techniques described above can be optimized in several ways. In an embodiment, hardware shape blending 504' (as shown in FIG. 5) is used when only one color attachment is associated with the framebuffer. This is common, for instance, in RGB documents where shape recording is not required (e.g., when an object's grandparent and other objects higher in the hierarchy have no knockout groups). In these cases, the GPU hardware's dual source bender is used. The shape is computed in hardware by multiplying the fragment shader's output color with the object coverage C, writing the object's coverage C for every pixel to the alpha channel of the dual source output alpha channel of the fragment shader, and setting the dual source blend state to glBlendFunc(GL_ONE, GL_SRC1_ALPHA). Note that the effect can also be achieved with several minor variations, as will be apparent in view of the present disclosure.

In an embodiment, the ShapeTexture S can be shared among groups, rather than generated 402 anew for each group. For instance, a new ShapeTexture does not need to be explicitly created for a non-knockout transparency group (even when its parent hierarchy has a knockout group) because the shape of the non-knockout group is not used to determine the pixel color. An example of such a case is a non-knockout group within a parent knockout group that has no other children and the non-knockout group does not have AIS (Alpha Is Shape) property set.

Figure 7:
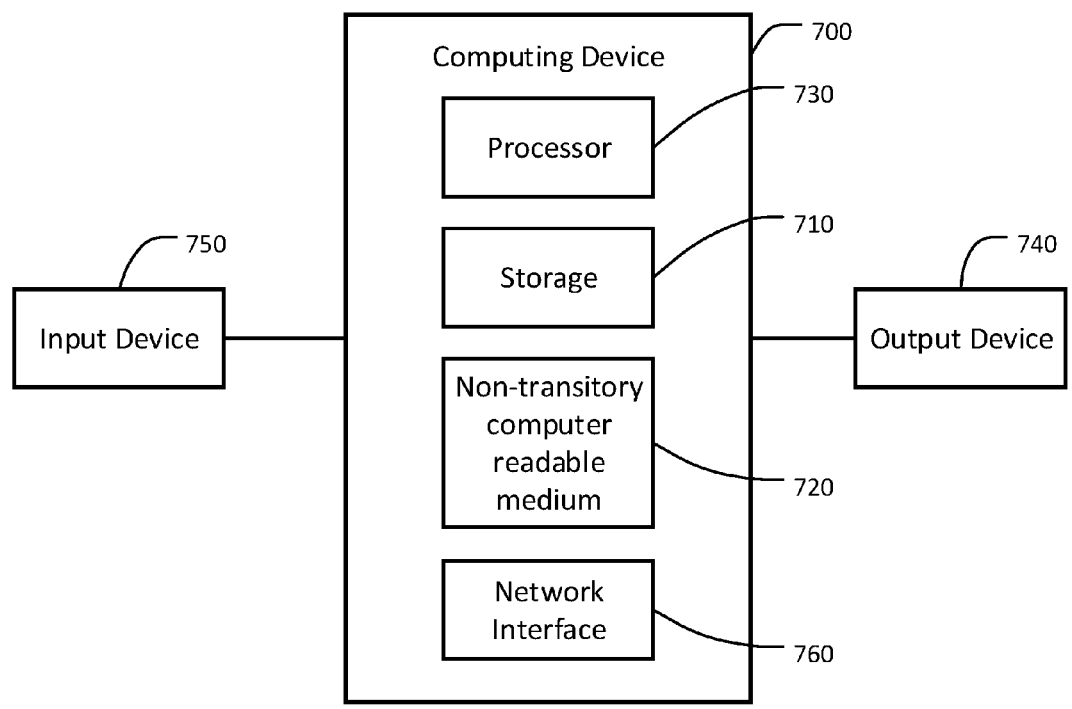
FIG. 7 is a block diagram representing an example computing device that may be used to perform any of the techniques as variously described in this disclosure.

FIG. 7 is a block diagram representing an example computing device 700 that may be used to perform any of the techniques as variously described in this disclosure. For example, the system 100 of FIG. 1, or any portions thereof, and the methodologies of FIGS. 4, 5 and 6, or any portions thereof, may be implemented in the computing device 700. The computing device 700 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided including a plurality of such computing devices.

The computing device 700 includes one or more storage devices 710 or non-transitory computer-readable media 720 having encoded thereon one or more computer-executable instructions or software for implementing techniques as variously described in this disclosure. The storage devices 710 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 710 may include other types of memory as well, or combinations thereof. The storage device 710 may be provided on the computing device 700 or provided separately or remotely from the computing device 700. The non-transitory computer-readable media 720 may include, but are not limited to, one or more types of hardware memory, non-transitory tangible media (for example, one or more magnetic storage disks, one or more optical disks, one or more USB flash drives), and the like. The non-transitory computer-readable media 720 included in the computing device 700 may store computer-readable and computer-executable instructions or software for implementing various embodiments. The computer-readable media 720 may be provided on the computing device 700 or provided separately or remotely from the computing device 700.

The computing device 700 also includes at least one processor 730 for executing computer-readable and computer-executable instructions or software stored in the storage device 710 or non-transitory computer-readable media 720 and other programs for controlling system hardware. Virtualization may be employed in the computing device 700 so that infrastructure and resources in the computing device 700 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 700 through an output device 740, such as a screen or monitor, which may display one or more user interfaces provided in accordance with some embodiments. The output device 740 may also display other aspects, elements or information or data associated with some embodiments. The computing device 700 may include other I/O devices 750 for receiving input from a user, for example, a keyboard, a joystick, a game controller, a pointing device (e.g., a mouse, a user's finger interfacing directly with a touch-sensitive display device, etc.), or any suitable user interface. The computing device 700 may include other suitable conventional I/O peripherals. The computing device 700 includes or is operatively coupled to various suitable devices for performing one or more of the aspects as variously described in this disclosure.

The computing device 700 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 700 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the rendering application 130, the GUI 160, or any combination of these, is implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 700, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a computer-implemented method of rendering knockout groups. The method includes compositing each object of a knockout group with a backdrop of the knockout group using means for blending a color of each pixel representing the respective object with a color of a pixel in the backdrop of the knockout group overlapped by the respective pixel, thereby producing an intermediate color of the respective pixel. The compositing is performed independently of a shape of any of the objects of the knockout group. The knockout group includes a plurality of objects encoded in a document, such as a Portable Document Format (PDF) document or a document similar to PDF. The method further includes means for computing a final color of each pixel representing the respective object as a function of the intermediate color, the color of the pixel in the backdrop prior to the blending, and the shape of the respective object, thereby knocking out at least a portion of the pixel in the backdrop based on the shape of the respective object. The method further includes storing the final color of each pixel in a framebuffer for rendering on a display device. In some cases, the shape of the respective object is represented by a fractional coverage value, and computing the final color of the respective pixel includes adding a product of the fractional coverage value and the intermediate color of the respective pixel to a product of a complement of the fractional coverage value and the color of the pixel in the backdrop. In some cases, the method includes generating data representing a single-sampled shape texture of the knockout group. In some such cases, the method includes attaching the single-sampled shape texture of the knockout group to the framebuffer. In some other such cases, the method includes recording an accumulated shape of all of the objects of the knockout group in the single-sampled shape texture of the knockout group. In yet some other such cases, the method includes consolidating the single-sampled shape texture of the knockout group with a single-sampled shape texture of a parent knockout group including a different plurality of objects in the PDF or similar document. In some such cases, the method includes compositing each object of the parent knockout group with a backdrop of the parent knockout group, where the backdrop of the parent knockout group includes the composited objects and consolidated shapes of the knockout group.

Another example embodiment provides a system for rendering knockout groups. The system includes a storage and a processor operatively coupled to the storage. The processor is configured to execute instructions stored in the storage that when executed cause the processor to carry out a process including compositing each object of a knockout group with a backdrop of the knockout group, the knockout group including a plurality of objects encoded in a document, such as a Portable Document Format (PDF) or a document similar to PDF, by blending a color of each pixel representing the respective object with a color of a pixel in the backdrop of the knockout group overlapped by the respective pixel, thereby producing an intermediate color of the respective pixel. The compositing is performed independently of a shape of any of the objects of the knockout group. The process further includes computing a final color of each pixel representing the respective object as a function of the intermediate color, the color of the pixel in the backdrop prior to the blending, and the shape of the respective object, thereby knocking out at least a portion of the pixel in the backdrop based on the shape of the respective object. The process further includes storing the final color of each pixel in a framebuffer for rendering on a display device. In some cases, the shape of the respective object is represented by a fractional coverage value, and computing the final color of the respective pixel includes adding a product of the fractional coverage value and the intermediate color of the respective pixel to a product of a complement of the fractional coverage value and the color of the pixel in the backdrop. In some cases, the process includes generating data representing a single-sampled shape texture of the knockout group. In some such cases, the process includes attaching the single-sampled shape texture of the knockout group to the framebuffer. In some other such cases, the process includes recording an accumulated shape of all of the objects of the knockout group in the single-sampled shape texture of the knockout group. In yet some other such cases, the process includes consolidating the single-sampled shape texture of the knockout group with a single-sampled shape texture of a parent knockout group including a different plurality of objects in the PDF or similar document. In some such cases, the process includes compositing each object of the parent knockout group with a backdrop of the parent knockout group, wherein the backdrop of the parent knockout group comprises the composited objects and consolidated shapes of the knockout group. Another example embodiment provides a non-transitory computer program product having instructions encoded thereon that when executed by one or more computer processors cause the one or more computer processors to perform a process such as set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method of rendering knockout groups, the method comprising:

compositing, by a graphics processing unit (GPU), each object of a knockout group with a backdrop of the knockout group, the knockout group including a plurality of objects encoded in a document, using means for blending a color of each pixel representing the respective object with a color of a pixel in the backdrop of the knockout group overlapped by the respective pixel independently of a shape of any of the objects of the knockout group, thereby producing an intermediate color of the respective pixel, and means for computing a final color of each pixel representing the respective object as a function of the intermediate color, the color of the pixel in the backdrop prior to the blending, and a fractional coverage value of the shape of the respective object, thereby knocking out at least a portion of the pixel in the backdrop based on the shape of the respective object, the final color of each pixel being computed by adding a product of the fractional coverage value and the intermediate color to a product of a complement of the fractional coverage value and the color of the pixel in the backdrop;

storing the final color of each pixel in a framebuffer of the GPU for rendering on a display device; and generating, using the GPU, a rendered image based on the final color of each pixel stored in the framebuffer.

2. The method of claim 1, further comprising generating, by the GPU, data representing a single-sampled shape texture of the knockout group.

3. The method of claim 2, further comprising attaching, by the GPU, the single-sampled shape texture of the knockout group to the framebuffer.

4. The method of claim 2, further comprising recording, by the GPU, an accumulated shape of all of the objects of the knockout group in the single-sampled shape texture of the knockout group.

5. The method of claim 2, further comprising consolidating, by the GPU, the single-sampled shape texture of the knockout group with a single-sampled shape texture of a parent knockout group including a different plurality of objects encoded in the document.

6. The method of claim 5, further comprising compositing each object of the parent knockout group with a backdrop of the parent knockout group, wherein the backdrop of the parent knockout group comprises the composited objects and consolidated shapes of the knockout group.

7. A system for rendering knockout groups, the system comprising:

a storage; and a graphics processing unit (GPU) operatively coupled to the storage, the GPU configured to execute instructions stored in the storage that when executed cause the GPU to carry out a process including compositing, by the GPU, each object of a knockout group with a backdrop of the knockout group, the knockout group including a plurality of objects encoded in a Portable Document Format (PDF) document, by blending a color of each pixel representing the respective object with a color of a pixel in the backdrop of the knockout group overlapped by the respective pixel independently of a shape of any of the objects of the knockout group, thereby producing an intermediate color of the respective pixel, and computing a final color of each pixel representing the respective object as a function of the intermediate color, the color of the pixel in the backdrop prior to the blending, and a fractional coverage value of the shape of the respective object, thereby knocking out at least a portion of the pixel in the backdrop based on the shape of the respective object, the final color of each pixel being computed by adding a product of the fractional coverage value and the intermediate color to a product of a complement of the fractional coverage value and the color of the pixel in the backdrop;

storing the final color of each pixel in a framebuffer of the GPU for rendering on a display device; and generating, by the GPU, a rendered image based on the final color of each pixel stored in the framebuffer.

8. The system of claim 7, wherein the process further comprises generating data representing a single-sampled shape texture of the knockout group.

9. The system of claim 8, wherein the process further comprises attaching the single-sampled shape texture of the knockout group to the framebuffer.

10. The system of claim 8, wherein the process further comprises recording an accumulated shape of all of the objects of the knockout group in the single-sampled shape texture of the knockout group.

11. The system of claim 8, wherein the process further comprises consolidating the single-sampled shape texture of the knockout group with a single-sampled shape texture of a parent knockout group including a different plurality of objects encoded in the PDF document.

12. The system of claim 11, wherein the process further comprises compositing each object of the parent knockout group with a backdrop of the parent knockout group, wherein the backdrop of the parent knockout group comprises the composited objects and consolidated shapes of the knockout group.

13. A non-transitory computer readable medium having instructions encoded thereon that when executed by one or more computer processors cause the one or more computer processors to perform a process comprising:

compositing, by a graphics processing unit (GPU), each object of a knockout group with a backdrop of the knockout group, the knockout group including a plurality of objects encoded in a document, by blending a color of each pixel representing the respective object with a color of a pixel in the backdrop of the knockout group overlapped by the respective pixel independently of a shape of any of the objects of the knockout group, thereby producing an intermediate color of the respective pixel, and computing a final color of each pixel representing the respective object as a function of the intermediate color, the color of the pixel in the backdrop prior to the blending, and a fractional coverage value of the shape of the respective object, thereby knocking out at least a portion of the pixel in the backdrop based on the shape of the respective object, the final color of each pixel being computed by adding a product of the fractional coverage value and the intermediate color to a product of a complement of the fractional coverage value and the color of the pixel in the backdrop;

storing the final color of each pixel in a framebuffer of the GPU for rendering on a display device; and generating, by the GPU, a rendered image based on the final color of each pixel stored in the framebuffer.

14. The non-transitory computer readable medium of claim 13, wherein the process further comprises generating data representing a single-sampled shape texture of the knockout group.

15. The non-transitory computer readable medium of claim 14, wherein the process further comprises attaching the single-sampled shape texture of the knockout group to the framebuffer.

16. The non-transitory computer readable medium of claim 14, wherein the process further comprises recording an accumulated shape of all of the objects of the knockout group in the single-sampled shape texture of the knockout group.

17. The non-transitory computer readable medium of claim 14, wherein the process further comprises consolidating the single-sampled shape texture of the knockout group with a single-sampled shape texture of a parent knockout group including a different plurality of objects encoded in the document.

* * * * *